(No Model.)

H. B. KEIPER.
GEARING.

No. 604,662. Patented May 24, 1898.

Witnesses.
Chas. E. Riordon
John H. Hazelton

Inventor.
Henry B. Keiper
By Julian C. Dowell
His Attorney

UNITED STATES PATENT OFFICE.

HENRY B. KEIPER, OF LANCASTER, PENNSYLVANIA.

GEARING.

SPECIFICATION forming part of Letters Patent No. 604,662, dated May 24, 1898.

Application filed October 13, 1897. Serial No. 655,070. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Gearing; and I do hereby declare the following to be a full, clear, and exact description of the invention, such as will enable others skilled in the art to which it appertains to make and use the same.

This invention relates to that class of gearing wherein rollers take the place of teeth in transmitting motion, with the object of reducing friction to the minimum; and the present invention aims to provide an improved construction of gear-wheel wherein movement-transmitting balls may be confined in sockets in the wheel without requiring retainers as separate parts or attachments, the invention residing in a peculiar sectional construction of the body of the wheel itself whereby the desired result is attained.

The drawings which accompany and form part of this specification illustrate an embodiment of the invention in a bevel gear-wheel.

Figure 1:
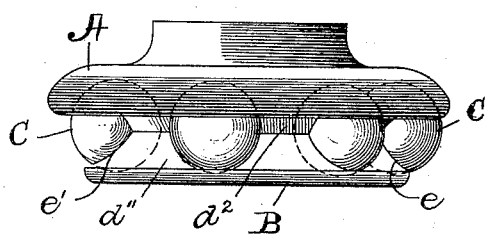
Figure 2:
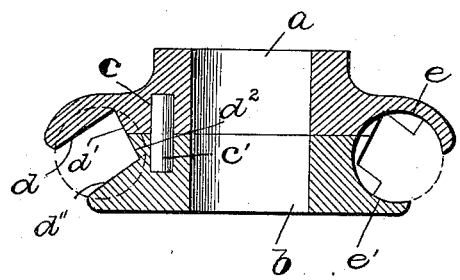
Figure 3:
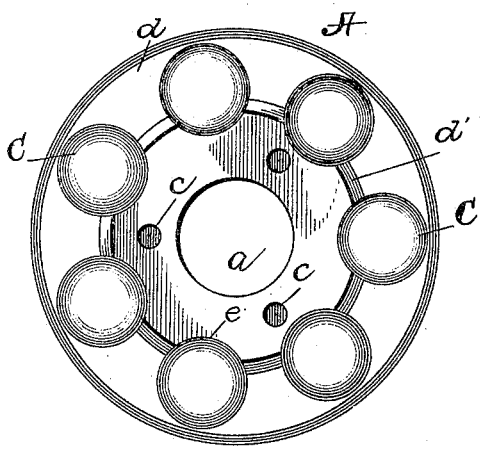
Figure 4:
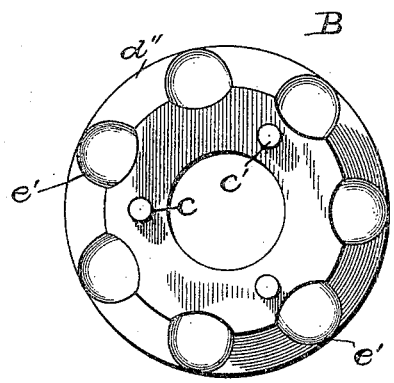

Of said drawings, Figure 1 represents a side elevation of the wheel. Fig. 2 represents an axial section of the same. Figs. 3 and 4 represent inner face views of the two sections of the wheel.

For the purposes of my invention the wheel is divided transversely or formed in two sections A and B, adapted to fit against each other, with their central bores $a$ and $b$ in alinement, the two sections thus adapted to be mounted on a shaft as an ordinary wheel and secured thereto in any suitable manner or secured together and rotatable together on the shaft. Holes $c$ are bored in the inner face of each section, these holes being adapted to register, and dowel-pins $c'$ engage said holes and rotatively connect the sections.

Where the wheel is rotatable on the shaft, the dowel-pins constitute means for rotatively connecting the two sections of the wheel. They will be held against separation in any suitable manner when assembled with the shaft. Where, however, the wheel is fixed to rotate with the shaft, it is apparent that the dowel-pins may be dispensed with, for when both members of the wheel have been rotatively engaged with the shaft obviously no further means for rotatively connecting the wheel-sections together are necessary. The same means which rotatively connect the members of the wheel with the shaft may constitute means for preventing their separation, or additional means may be employed for this purpose, all of which is so obvious as to require no illustration in the drawings.

The wheel here shown being of the bevel or miter variety, the section A thereof is of greater diameter than the section B and overhangs the plane of division between the two sections, the overhanging portion being undercut obliquely, as shown at $d$, to form one side of an encircling groove, whose opposite side is formed by cutting away the other section B on the same angle and whose bottom consists of the alining surfaces of conical portions $d'$ and $d^2$ of the two sections A and B.

Each of the wheel-sections is formed with a series of sockets in the sides and bottom of the said encircling grooves, those in the section A being designated by the letter $e$ and those in the section B by the letter $e'$. These sockets register when the sections are properly fitted together and form a circular series of spheroidal recesses opening out of the beveled periphery of the wheel, the encircling groove passing centrally through them, but being of less width and depth than the same. Balls C seat in the spheroidal recesses, and the object of the groove is to permit extended engagement with said balls of the teeth of an intermeshing wheel, while the balls themselves project but slightly from the periphery of the wheel.

It will be seen that the construction described provides for confining the balls without the necessity of retaining means in the form of separate attachments, but by the sectional formation of the wheel itself. Thus the object primarily stated is accomplished and that, too, by very simple and practical means.

Having thus fully described my invention, what I claim as new, and desire to secure by Letters Patent of the United States, is—

1. A gear-wheel divided transversely, and each section having a series of sockets registering with the corresponding series of sockets in the other section, and each section having an encircling channel registering with that in the other section, each two registering sockets together forming a spheroidal recess opening out of the periphery of the wheel, and the registering encircling channels together forming a groove extending centrally through the recesses and opening out of the periphery of the wheel and being of reduced width as compared with the recesses, balls seated in said recesses and confined therein by reason of the spheroidal form of the latter; and means securing the sections of the wheel together.

2. A gear-wheel divided transversely, and each section having a series of sockets registering with the corresponding series of sockets in the other section, and each section having an encircling channel registering with that in the other section, each two registering sockets together forming a spheroidal recess opening out of the periphery of the wheel, and the registering encircling channels together forming a groove extending centrally through the recesses and opening out of the periphery of the wheel and being of reduced width and depth as compared with the recesses; balls seated in said recesses and confined therein by reason of the spheroidal form of the latter; and means securing the sections of the wheel together.

In testimony whereof I affix my signature in presence of two witnesses.

HENRY B. KEIPER.

Witnesses:
HARVEY B. LUTZ,
LUCY. R. KEIPER.